Oct. 8, 1957  SEIICHI MAMIYA  2,808,770
CAMERA RANGE FINDER
Filed May 12, 1955

United States Patent Office 2,808,770
Patented Oct. 8, 1957

2,808,770

CAMERA RANGE FINDER

Seiichi Mamiya, Bunkyo-ku, Tokyo-to, Japan

Application May 12, 1955, Serial No. 507,943

Public Law 619, August 23, 1954
Patent expires April 25, 1967

2 Claims. (Cl. 95—44)

This invention relates to cameras, particularly to an improved camera rangefinder which is coupled to a focus adjuster.

The usual camera rangefinders coupled with a focus adjuster are relatively complex in their construction and expensive to manufacture. Furthermore, they are relatively difficult to adjust and are apt to get out of order due to vibration occurring in the shipping of the camera and by its being transported and carried about.

It is an object of this invention to provide an improved camera rangefinder overcoming the disadvantages described above.

This object and other objects of this invention have been accomplished by the camera rangefinder which is composed of a hollow main body portion supporting an objective lens, an eye-piece and a first semitransparent reflecting mirror arranged so as to make the light rays coming from said lens pass directly through said mirror towards said eye-piece and to reflect the light rays coming from a second reflecting mirror towards said eye-piece and a hollow auxiliary body portion provided with a window directed to the object and supporting the second reflecting mirror so as to reflect the light rays coming from said window towards said first reflecting mirror, both of said bodies being threaded or frictionally engaged so as to be adjusted in their relative positions.

In the embodiment of this invention, it is preferable to fix said bodies as one unit by a suitable adhesive at their engagement positions after first adjusting their relative positions.

This invention will be clearly understood by the following description in connection with the accompanying drawing, wherein.

Figure 1:
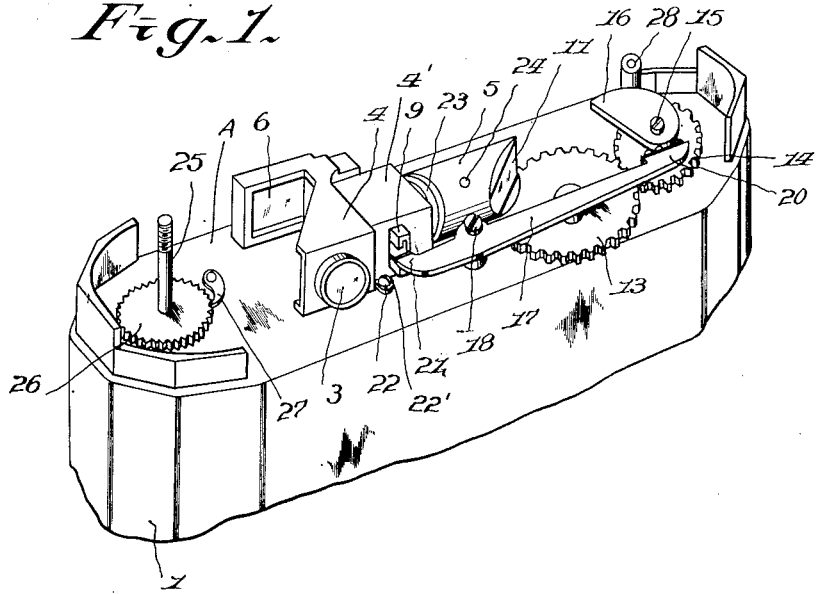
Fig. 1 is a perspective view of a rangefinder in accordance with the invention; the rangefinder is shown attached to a camera case with the cover of the rangefinder removed.

Referring to the drawings the rangefinder is composed of a hollow main body portion 4 and a hollow auxiliary body portion 5, said main body portion 4 being provided with an eye piece 3, an objective 6, a partially transparent or semitransparent reflecting mirror or reflector 2 which is arranged at an angle between eye piece 3 and the objective 6. A hollow member 4' is provided integral with portion 4 and is directed in a direction substantially perpendicular to the optical axis of said eye piece and objective lens. The auxiliary body portion 5 is provided with a screw thread 7 to be screwed in an internal thread of said member 4'. The body portion 4 is attached to the upper surface A of a camera case 1 by lug 22 and a screw 22' after engagement of said auxiliary body portion 5 with the main body portion 4.

Figure 2:
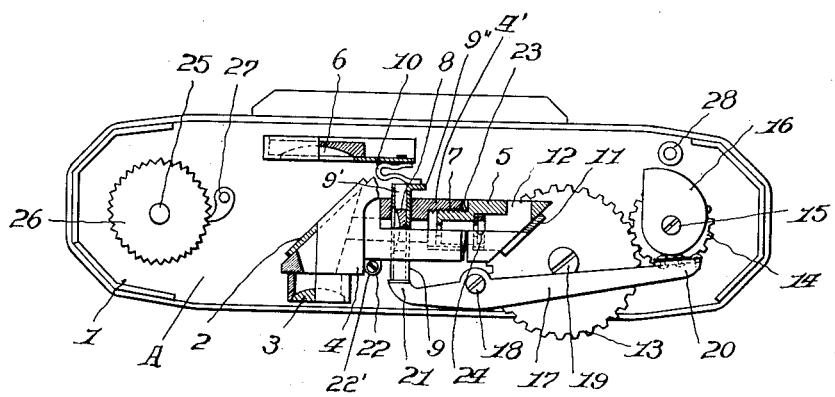
Fig. 2 is a plan partly cross sectional view of the rangefinder illustrated in Fig. 1.

A frame 9 supporting a concave lens 8 therein is slidably inserted in hollow member 4' in a crosswise direction so as to be shifted forwards and backwards against the spring force of a spring 10. The spring 10 is fixed at one end to the main body portion 4 and makes contact at the other end with the front end surface 9'' of frame 9 so as to bias said frame in a backwards direction. The point of contact between spring 10 and frame 9 is selected so as to be offset with respect to the center line of the frame so that the pushing force may be exerted in a direction parallel to the longitudinal axis of the frame as shown in Fig. 2.

Accordingly, slidable shifting of the frame 9 as later discussed herein is always carried out smoothly without chattering, thereby permitting accurate adjustment of the lens 8 in the frame 9'. This is a most important feature of this invention.

The auxiliary body portion 5 is provided with a window 12 directed to the object. Said body portion 5 supports a reflecting mirror or reflector 11 which is parallel to the semi-reflecting mirror 2.

Members 2, 3, 6, 8, 11 and 12 are arranged and combined so that the image of the object focused directly on the eye piece 3 through the lens 6 and mirror 2 can be brought in coincidence with the image of the object indirectly focused on said eye piece through the window 12, reflecting mirror 11, lens 8 and semitransparent reflecting mirror 2. This adjustment is accomplished by shifting the frame 9, specifically the lens 8 by adjusting the pushing force exerted on said frame by a lever 17 as will be described later herein.

The mechanism coupling said rangefinder with the focus adjuster comprises a cam 16 fixed to a rotary shaft 15 of a gear 14 meshing with another gear 13 and fixed to the shaft 19 of the focus adjuster (not shown) enclosed in the camera case 1 and a lever 17 pivoted at a pivotal shaft 18 provided on the camera case 1. The ends 20 and 21 of said lever 17 are in contact with cam 16 and the back end of the frame 9 supporting the concave lens 8 respectively, as shown. It is easily possible to make both images as described above coincide by adjusting gear 13 manually.

The auxiliary body portion 5 is provided with a hole 24 for engaging a thin rod therein (not shown) so as to rotate said body portion 5 relative to the hollow member 4' in the event that it is desired to adjust the angle of said reflecting mirror 11. A spring washer 23 is positioned.

In the drawing, between portions 4 and 5 a film winding shaft 25 is provided with a gear 26 which is hooked by a pawl 27 so as to permit only counterclockwise rotation of the shaft. A shutter button 28 is provided.

Generally, in such a camera having a rangefinder coupled with a focus adjuster as described above, it is necessary to adjust suitably the angle of the reflecting mirror 11.

According to this invention, this latter adjustment can be easily made by rotating slightly the auxiliary body portion 5 relative to the hollow member 4 of the main body portion 4. For preventing the auxiliary body 5 from free rotation thereof after adjustment, any suitable adhesive such as lacquer may be poured in the gap at the washer 23.

The engagement of the main and auxiliary body portions may be done in another manner different from said screw thread method. That is, they may be frictionally fitted without using screw threads so as to be adjusted in their relative positions.

The operation of the rangefinder in combination with the focus adjuster is as follows: The camera being directed at an object the operator is able to observe the direct object in the eyepiece 3. By rotating gear 13 (Fig. 2) as for example by his thumb, the gear 14 is also rotated so as to rotate cam 16. The cam follower end 20 of lever 17 is moved either forwardly or backwardly simultaneously moving the end 21 of lever 17 in an opposite direction. Accordingly the frame 9 and thus lens 8 is moved transversely to the rays of light being reflected by mirror 11. Thus the indirect image is brought into coincidence with the direct image both being viewed by the operator in the eye piece 3. Rotation of gear 13 adjusts the focus adjustor (not shown) enclosed in the camera case. Hence the rangefinder assures proper focusing for the range at which the camera is to be operated.

Since the frame 9 is resiliently held between end 21 of lever 17 and spring 10 it can readily be seen that the lens 8 may be positioned accurately so as to make the images coincide perfectly. Moreover, the spring 10 exerts a steady force on the frame 9 parallel to the longitudinal axis but not overcoming the frictional drag of the lever, gears and adjustor thus permitting a smooth, easy and accurate adjustment of the rangefinder without chattering as would be the case if the spring exerted force on the plane of the longitudinal axis of the frame.

It will be understood that the details and examples hereinbefore set forth are illustrations only and that this invention is in no way limited thereby.

I claim:

1. In a camera having an objective and a focus adjustor, an improved rangefinder comprising in combination a hollow main body portion supporting the objective, an eye piece, a partially transparent reflector, a hollow auxiliary body portion removably engaging said main body portion, said auxiliary body portion being provided with an opening directed at the object, a mirror supported by said auxiliary body portion positioned to reflect an indirect image of the object to said partially transparent reflector, said reflector being positioned at an angle relative to the optical axes of the objective, the eye piece and the mirror, whereby a direct and an indirect image of the object are reflected on the eye piece, a frame slidable longitudinally in said main body portion and positioned with its longitudinal axis substantially normal to the optical axis of said mirror, a lens carried in said frame, said lens having its optical axis substantially normal to the longitudinal axis of the frame, resilient means biasing said frame in one direction, said resilient means being positioned so as to exert a force on said frame in a plane substantially parallel to a plane extending through the longitudinal axis of the frame, operator-actuated means operably coupled to said focus adjuster and engaging said frame opposite to said resilient means, whereby in order to focus for a specific range the operator actuated means is actuated to displace said frame and lens longitudinally without chatter so as to make the direct and indirect image coincide accurately and the focus is accurately adjusted as a function of the range.

2. In a camera having an objective and a focus adjustor, an improved range finder comprising in combination a hollow main body portion supporting the objective, an eye piece, a partially transparent reflector, a hollow auxiliary body portion removably engaging said main body portion, said auxiliary body portion being provided with an opening directed at the object, a mirror supported by said auxiliary body portion positioned to reflect an indirect image of the object to said partially transparent reflector, said reflector being positioned at an angle relative to the optical axes of the objective, the eye piece and the mirror, whereby a direct and an indirect image of the object are reflected on the eye piece, a frame slidable longitudinally in said main body portion and positioned with its longitudinal axis substantially normal to the optical axis of said mirror, a lens carried in said frame, said lens having its optical axis substantially normal to the longitudinal axis of the frame, resilient means biasing said frame in one direction, said resilient means being positioned so as to exert a force on said frame in a plane substantially parallel to a plane extending through the longitudinal axis of the frame, a lever pivotally mounted having one end operably engaging said frame at a point opposite to said resilient means, a cam engaging the other end of the lever, means to rotate the cam, said last mentioned means being operably coupled to said focus adjuster, whereby actuation of said last mentioned means rotates the cam so as to pivot the lever and displace the frame longitudinally without chatter so as to make the direct and indirect image coincide accurately and the focus is accurately adjusted as a function of the range.

References Cited in the file of this patent

UNITED STATES PATENTS

| 1,722,520 | Glancy | July 30, 1929 |

FOREIGN PATENTS

| 907,304 | France | June 18, 1945 |
| 907,377 | France | June 25, 1945 |